Dec. 8, 1964     J. LA PENNA ETAL     3,160,251
MOLDING CLIP
Filed Aug. 4, 1961

INVENTORS
JOSEPH LA PENNA
LEE R. JONES
BY
ATTORNEYS

United States Patent Office 3,160,251
Patented Dec. 8, 1964

3,160,251
MOLDING CLIP
Joseph La Penna, Grand Haven, and Lee R. Jones, Ferrysburg, Mich; said Jones assignor to James Church, Muskegon, Mich.; and said La Penna assignor to Michael M. Voyt, Muskegon, Mich.
Filed Aug. 4, 1961, Ser. No. 129,470
4 Claims. (Cl. 189—88)

This invention concerns molding clips, and particularly molding clips adaptable for use with a variety of shapes and sizes of moldings.

This application is a continuation-in-part of application Serial No. 41,869 filed July 11, 1960, and, now abandoned, entitled Molding Clip.

Molding clips are widely used in the automobile industry and other manufacturing industries for attaching trim to structural panels. Because trim strips or moldings differ widely in size and shape from one another, and because many different sizes and shapes of moldings are often used on a single article, it has been necessary, particularly in service shops, to keep on hand a wide variety of molding clips, each of which was adapted to a single nominal size and shape of molding. Also, prior art clips had to be slid in from the end of the molding, which was often inconvenient and time-consuming; and once a molding clip was inserted in the molding, it was quite difficult to remove for repair or replacement purposes.

The present invention discloses a molding clip which can be readily used with a wide variety of sizes and shapes of moldings, can be screwed into the molding at any point, and can readily be removed therefrom. The invention accomplishes this result by providing a molding clip with a generally conical head which is resilient both in a radial direction and in an axial direction.

It is therefore the primary object of this invention to provide a molding clip which can be used equally well with flat moldings and moldings of triangular cross section, and with widely varying sizes of each.

It is another object of this invention to provide a molding clip which can be screwed into a molding at any point.

It is a further object of this invention to provide a molding clip which can easily be removed from the molding without disturbing adjacent clips.

It is still another object of this invention to provide a moding clip capable of giving structural support to a molding of triangular cross-section.

These and other objects of this invention will be readily apparent from the following specification, taken in connection with the attached drawings in which.

Basically, the invention consists of forming the head of the molding clip in the form of a resilient conical spiral with a plurality of convolutions. Thus, the convolutions can be radially compressed to fit into moldings of different heights, as well as axially compressed to fit the interior of a flat molding. The outward end of the spiral may be bent in a direction away from the apex of the cone formed by the head so as to facilitate unscrewing of the clip in a manner hereafter described.

Figure 1:
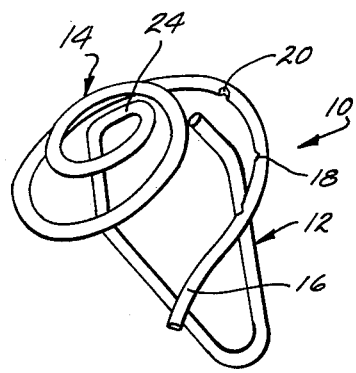
FIG. 1 is a perspective view of the clip of this invention.

Referring now to the drawings, the clip of this invention is generally shown as 10 in FIG. 1. The clip 10 has a resilient shank 12 and a resilient head 14, both being preferably formed from a single piece of spring wire. The head 14 is composed of several spiral convolutions which define a cone as appears more clearly from FIG. 3, and the head 14 terminates in a tail 16 which is bent sharply away from the apex of head 14.

The clip 10, as will be shown hereinafter, is adaptable for use with many different sizes and shapes of moldings without alteration. If, however, it becomes necessary to use the clip 10 with a particularly small molding, the free end of the outer head convolution may be broken off at a notch such as 18 which may be provided in the outer convolution. In that case, a next following notch or indentation 20 may be provided to permit the portion of the wire between notches 18 and 20 to be bent down to form a tail 16.

Figure 2:
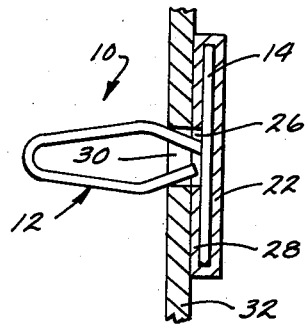
FIG. 2 is a vertical section of a flat molding showing the condition of the clip when it is used to apply a flat molding to a panel.

The use of the clip 10 with a flat molding 22 is illustrated in FIG. 2. To affix the clip 10 to the molding 22, it is merely necessary to insert the innermost convolution 24 of the clip 10 into the opening 26 of molding 22, and to turn the clip like a screw. As the clip is turned, the convolutions of the head 14 gradually become caught by the shoulders 28 of the molding 22 and become compressed thereby into a single plane with the inner convolution 24. In other words, screwing the clip 10 into a flat molding automatically flattens the head of the clip to conform to the shape of the molding. The shank of the molding can then be inserted through aperture 30 of the panel 32, where it is locked in place in a well-known manner due to the resiliency of shank 12.

Figure 3:
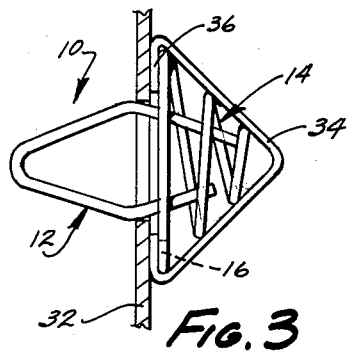
FIG. 3 is a vertical section through a triangular molding showing the manner in which the same clip can be used to fasten a triangular molding to a panel.

If it is now desired to use the clip 10 with a triangular molding instead of a flat molding, the condition of FIG. 3 results. As the convolutions of the head 14 are screwed into the molding 34, the convolutions adapt themselves to just fit the interior of molding 34 in the manner shown in FIG. 3. It will be noted that in this condition, the clip 10 lends structural rigidity to the molding 34 by supporting it in several places throughout the thickness of the molding, rather than just adjacent to the flanges 36 as prior art clips did.

Figure 4:
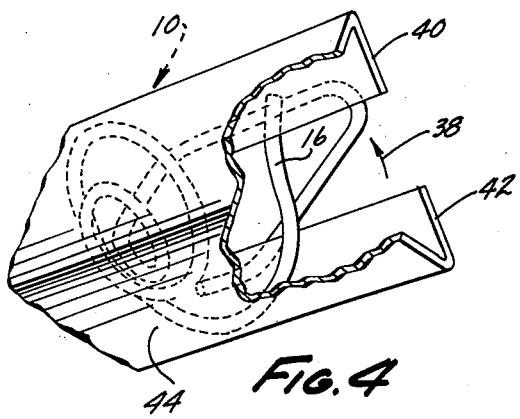
FIG. 4 is a perspective view of the clip of this invention in the triangular molding showing how the clip can be unscrewed from the molding.

FIG. 4 shows the manner in which the clip of this invention can easily be unscrewed from a molding. If the clip 10 is turned in the direction indicated by arrow 38, the tail 16 tends to pass through the plane formed by the flanges 40, 42 as soon as it clears the flange 42. As the motion in the direction of arrow 38 continues, the tail 16 therefore assumes a position like that shown in FIG. 4. It will be readily seen that further motion in the direction of arrow 38 results in unscrewing the clip from the molding 44. On the other hand, when the clip 10 is screwed into the molding 44, the resiliency of tail 16 permits it to be straightened out into parallelism with the flange 42 as is indicated in FIG. 3.

Figure 5:
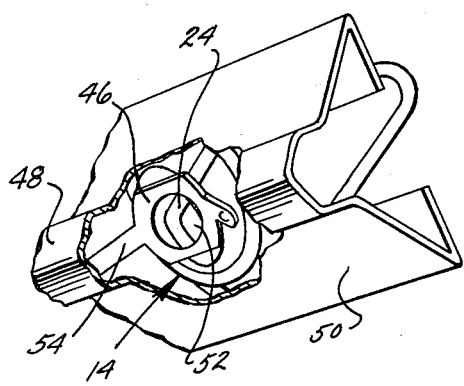
FIG. 5 is a cut-away perspective view showing the manner in which the clip of this invention can be adapted for use with an extra deep molding.

In certain special moldings such as shown in FIG. 5 in which the depth of the molding exceeds the axial dimension of the cone formed by head 14, it may be desirable to insert a spring washer 46 between the inner convolution 24 of head 14 and the apex 48 of molding 50. In this case, the inner convolution 24 of head 14 is preferably positioned to to engage the central opening 52 of the spring washer 46. The arms 54 are adapted to engage the apex 48 of molding 50 so as to lend a desirable rigidity to the assembled structure.

It will be seen that the present invention provides a versatile molding clip adaptable for use with almost any size and shape of molding or trim strips. The embodiment shown in the drawings is intended as illustrative only, and since the inventive concept can be carried out in various other forms, I do not intend to be limited by the embodiment shown but only by the scope of the following claims.

We claim:

1. In combination with a molding of generally V-shaped cross section having inwardly facing flanges at each end of the V, a clip attaching the same to a perforated panel, said clip comprising: a head formed of a continuous spiraling plurality of turns of resilient wire defining a cone having an apex angle generally similar to the apex angle of said V and having a radially outermost turn of a diameter sufficient to be held in said molding by said flanges when said head is screwed into said molding; and a shank having a resiliently expanding portion capable of being compressingly pushed through a perforation of said panel therebehind for holding said clip and molding in place on said panel.

2. In combination with a hollow molding having a pair of inwardly facing, generally coplanar flanges adapted to lie against a panel, a clip attaching the same to said panel, said clip comprising: a head formed of a continuous spiraling plurality of turns of resilient wire defining a cone and having a radially outermost turn of a diameter sufficient to be held in said molding by said flanges when said head is screwed into said molding; and means for attaching said clip to said panel; said outermost turn having an end portion lying at an angle to the plane of said flanges in such a manner as to resiliently pass through said plane between said flanges when said clip is unscrewed.

3. In combination with a hollow molding having a pair of inwardly facing, generally coplanar flanges adapted to lie against a panel, a clip attaching the same to said panel, said clip comprising: a head formed of a continuous spiraling plurality of turns of a resilient wire defining a cone and having a radially outermost turn of a diameter sufficient to be held in said molding by said flanges when said head is screwed into said molding; means for attaching said clip to said panel; and a plurality of spaced notch means in the radially outer ones of said turns to permit predetermined lengths of said turns to be broken off to cause said clip to fit moldings of various sizes.

4. In combination with a hollow molding having a pair of inwardly facing, generally coplanar flanges adapted to lie against a panel, a clip attaching the same to said panel, said clip comprising: a head formed of a continuous spiraling plurality of turns of resilient wire defining a cone and having a radially outermost turn of a diameter sufficient to be held in said molding by said flanges when said head is screwed into said molding; and a shank having a resiliently expanding portion capable of being compressingly pushed through a perforation of said panel to expand therebehind for holding said clip and molding in place on said panel.

References Cited in the file of this patent

UNITED STATES PATENTS

| | | |
|---|---|---|
| 615,795 | Brinkerhoff | Dec. 13, 1898 |
| 1,427,782 | Brogan | Sept. 5, 1922 |
| 2,047,708 | Reene Kamp | July 14, 1936 |
| 2,092,370 | Cash | Sept. 7, 1937 |
| 2,197,590 | Place | Apr. 16, 1940 |
| 2,958,914 | Krach | Nov. 8, 1960 |

FOREIGN PATENTS

| | | |
|---|---|---|
| 4,332 | Great Britain | Aug. 25, 1910 |
| 762,608 | Great Britain | Nov. 28, 1956 |
| 460,620 | France | Oct. 9, 1913 |